285-189 SR
11/4/86 OR 4 000,155

United States Statutory Invention Registration [19]

[11] Reg. Number: H155
[43] Published: Nov. 4, 1986

Childress

[54] FLUID CONNECTION

[75] Inventor: James J. Childress, Inyokern, Calif.

[73] Assignee: The United States of America as represented by the Secretary of the Navy, Washington, D.C.

[21] Appl. No.: 762,645

[22] Filed: Aug. 5, 1985

[51] Int. Cl.[4] ..... F16L 5/00
[52] U.S. Cl. ..... 285/189; 29/445; 92/163; 92/169
[58] Field of Search ..... 285/189, 158, 55, DIG. 16, 285/DIG. 19; 29/445; 92/144, 169, 171, 163; 156/293

[56] References Cited

U.S. PATENT DOCUMENTS

| | | | |
|---|---|---|---|
| 2,381,500 | 8/1945 | Knudsen et al. | 285/189 |
| 2,935,341 | 5/1960 | Steinen | 285/18 |
| 3,016,248 | 1/1962 | Lindberg | 285/158 |
| 3,106,940 | 10/1963 | Young | 138/125 |
| 3,711,347 | 1/1973 | Wagner et al. | 156/293 |
| 3,815,214 | 6/1974 | Kyle, Sr. | 29/450 |
| 3,834,740 | 9/1974 | Bazant et al. | 285/189 |
| 3,874,063 | 4/1975 | Skinner et al. | 29/450 |
| 4,186,945 | 2/1980 | Hahn | 285/158 |
| 4,256,525 | 3/1981 | Allen | 156/293 |
| 4,289,334 | 9/1981 | Riley | 285/55 |
| 4,300,439 | 11/1981 | Degnan et al. | 92/171 |

FOREIGN PATENT DOCUMENTS

| | | | |
|---|---|---|---|
| 1227037 | 3/1971 | United Kingdom | 285/158 |
| 1725036 | 2/1977 | Fed. Rep. of Germany | 285/55 |

*Primary Examiner*—Harold J. Tudor
*Attorney, Agent, or Firm*—W. Thom Skeer; Stephen J. Church

[57] ABSTRACT

A fluid connection for a container and a method of making the connection is described. The connection is provided subsequent to the manufacture of the container according to the teachings of the present invention.

8 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLUID CONNECTION

BACKGROUND OF THE INVENTION

1. Field of the Invention

This invention relates to fluid connections. More particularly, this invention relates to fluid connections for hydraulic or similar cylindrical assemblies having a thin metal liner reinforced by a layer of resin impregnated filament.

2. Description of the Prior Art

Hydraulic cylinder assemblies such as those utilized for actuating aircraft controls are generally constructed of a relatively thin metal liner reinforced to withstand normal operational pressure. Resin impregnated filament composites are often used as the reinforcing material of choice because of the resulting low weight, cost, and resistance to malfunction if the device is penetrated by a projectile.

Existing assemblies utilize integral, side-mounted tubes or connections for conducting hydraulic fluid. These tubes are welded to the exterior of the metal liner prior to application of the reinforcing material. Alternately, concentric tubes or connections extending axially from either end of a cylindrical assembly may be used.

The first arrangement complicates emplacement of the reinforcing wrapping due to the need to pass filaments around or under the installed tubes. The second arrangement requires seals and element internally of the liner thereby increasing the cost of manufacture and resulting weight of the finished unit. The second arrangement is also impractical for use with a cylinder assembly having a plurality of internal coaxially related pistons.

SUMMARY OF THE INVENTION

In accordance with the broader aspects of this invention, there is provided a connection comprising a tubular fluid source and a beveled interior end section communicating with the assembly interior. The cylinder assembly preferably is of composite construction having a thin metal liner with one or more bosses formed on the liner surface. The liner is reinforced by a layer or layers of resin impregnated filament. A channel or passageway is drilled through the exterior filament layer so as to pass through the liner and at least one boss providing a conduit into the cylinder cavity. The port thus formed has an internal beveled surface which diverges radially outwardly of the liner. The tubular insert is positioned in the channel until the beveled interior end section abutts the internal beveled surface of the boss. A resilient O-ring or similar seal is provided at the juncture of the boss beveled surface and the beveled interior end section of the tubular insert to provide a fluid tight seal.

OBJECTS OF THE INVENTION

It is, therefore, a primary object of the present invention to provide articles such as pressure vessels, fluid actuated cylindrical assemblies and the like having fluid connections provided subsequent to the manufacture of the device.

It is a further object of the invention to provide a method for providing a fluid connection in a molded or cast container having a reinforced metallic inner liner by cutting or drilling through the outer structural filamentary material and the metallic inner layer boss surface to form a connection conduit.

Yet another object of the invention is to provide improved articles such as pressure vessels, fluid actuated cylindrical assemblies and the like, and improvements in the manufacture thereof.

These and other objects of the invention will become more readily apparent from the following specification when read in light of the drawing.

DESCRIPTION OF THE PREFERRED EMBODIMENT

Figure 1:
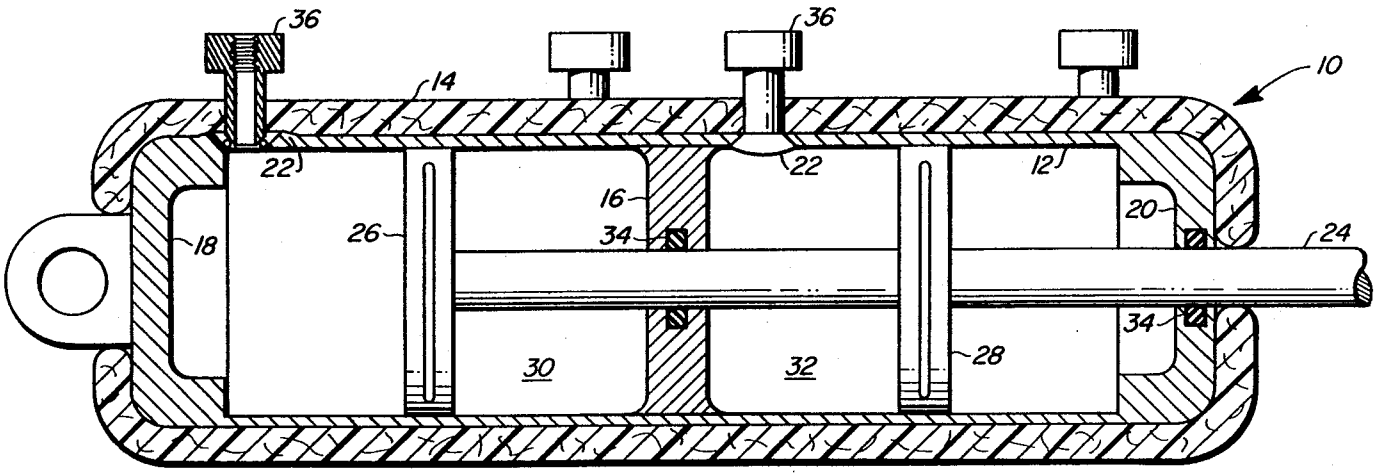
FIG. 1 is a partial cross-sectional view of one embodiment of the invention wherein a connection is provided in a fluid actuated assembly.
Figure 2:
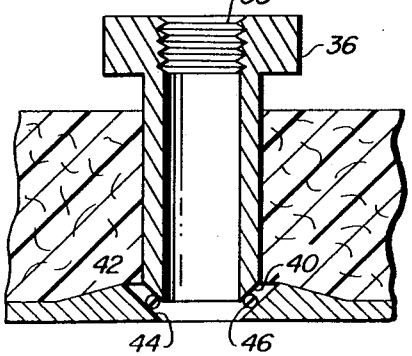
FIG. 2 is an enlarged cross-sectional view of the connection in greater detail.

Referring concurrently to FIGS. 1 and 2, a hydraulic cylinder assembly 10 is disclosed having a thin metal inner liner 12 reinforced with an outer layer 14 of resin impregnated filament composite material. The liner is provided with a central bulkhead 16, a pair of opposing heads 18 and 20 retained on liner 12 by filament layer 14, and four bosses or boss surfaces, designated at 22. A fluid driven piston rod 24 extends medially through assembly 10 and central bulkhead 16. A pair of pistons 26 and 28 are attached to rod 24 and positioned in chambers 30 and 32 defined by central bulkhead 16. Conventional fluid seals 34 are provided in head 20 and bulkhead 16. Four tubular fluid connections 36 including a threaded exterior portion 38 and a beveled interior end section 40 are provided for introducing fluid into assembly 10. Each connection is located above and in vertical alignment with each boss surface 22.

The cylinder assembly is initially constructed without fluid connections. The liner, including the bulkhead, opposing heads, piston rod, and boss surfaces, is first covered with the resin impregnated filament composite material layer. Upon curing the outer layer, a channel 42 is drilled through the layer of filament material and passing through each boss surface in the metallic liner so as to form an internal beveled boss surface 44 diverging radially outwardly of the liner. It is evident from FIG. 1 that channel 42 has a first portion through layer 14 and a second portion through the corresponding boss 22 of layer 12 and it is evident that the second portion is cut in the same operation as the first portion as an extension thereof. Next, a resilient seal 46 is inserted into channel 42 and retained on beveled boss surface 44. Finally, a fluid connection 36 is inserted into each channel 42 until the beveled interior end section 40 is in abutting engagement in a direction lengthwise of the channel with the resilient seal, as best shown in FIG 2. The connection may be sealed in place within the channel by any suitable means such as by gluing or utilizing a compatable resin.

While the preparation of only one connection has been described in detail, it is to be understood that multiple connections may be provided utilizing the disclosed method.

Obviously, many modifications and variations of the invention are possible without departing from the scope of the appended claims.

What is claimed is:

1. A method for providing a fluid connection in a molded or cast container having a relatively thin metallic inner liner including at least one raised boss, said container reinforced by at least one outer layer of resin-impregnated filament, the improvement comprising the steps of:

drilling through said layer, liner, and said raised boss to form a channel therethrough to form a beveled boss surface diverging radially outwardly;

inserting a resilient sealing ring within said channel;

seating said sealing ring on said beveled boss surface;

inserting a hollow, generally tubular connection including a threaded exterior portion and a beveled interior end section into said channel;

angularly disposing said tubular insert beveled interior end section in planar abutting engagement with said boss beveled surface such that said resilient sealing ring is disposed thereinbetween; and sealing said connection in place within said channel.

2. A method according to claim 1 wherein said resilient sealing ring is a circular O-ring.

3. A method according to claim 3 wherein said connection is sealed in place by gluing.

4. A fluid connection for a molded or cast container having a relatively thin metallic inner liner reinforced by at least one outer layer of resin-impregnated filament, said connection comprising a beveled port section diverging radially outwardly through said liner and in communication with the interior of said container, a channel through said filament layer communicating with said port section and the exterior of said container, a generally tubular insert including a threaded exterior portion sealed in place within and extending the length of said channel and having a beveled interior end section disposed angularly adjacent said beveled port section, and a resilient sealing ring in planar abutting engagement between said beveled sections.

5. A fluid connection according to claim 4 wherein said resilient sealing ring is a circular O-ring.

6. A method for providing a fluid connection in a cylinder assembly having a relatively thin metal liner reinforced by an outer layer of composite material, the method comprising the steps of:

covering the liner with said layer;

cutting a first channel portion through the layer to the liner; providing a second channel portion through the liner in alignment with the first channel;

inserting sealing means within the first channel portion onto the linear;

inserting a generally tubular connection having an exterior portion and an end section within the first channel portion with the end section in engagement with said sealing means; and sealing the connection in place within the first channel portion.

7. The method of claim 6, wherein the second channel portion is cut in same operation as the first channel portion as an extension thereof.

8. A fluid connection for a container having a relatively thin metal liner reinforced by an outer layer of composite material, the connection comprising a port section through the liner communicating with the interior of the container; a channel through the layer communicating with the port section and the exterior of the container; a tubular insert having an exterior portion sealed in place within and extending the length of the channel and having an end section disposed adjacent to said port section; and sealing means disposed between said end section and said port section in a direction lengthwise of said channel.

* * * * *